United States Patent
Brown

(10) Patent No.: US 7,221,133 B2
(45) Date of Patent: May 22, 2007

(54) HYBRID DIGITAL-ANALOG SWITCHED POWER SUPPLY

(75) Inventor: James S. Brown, San Pedro, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 11/068,184

(22) Filed: Feb. 28, 2005

(65) Prior Publication Data

US 2005/0189933 A1 Sep. 1, 2005

Related U.S. Application Data

(60) Provisional application No. 60/549,316, filed on Mar. 1, 2004.

(51) Int. Cl.
*G05F 1/46* (2006.01)
*G05F 1/618* (2006.01)

(52) U.S. Cl. .................. 323/283; 323/284

(58) Field of Classification Search .......... 323/283, 323/222–225, 282, 284, 351
See application file for complete search history.

(56) References Cited

U.S. PATENT DOCUMENTS 4,761,725 A * 8/1988 Henze .................. 363/46
6,020,729 A * 2/2000 Stratakos et al. ........ 323/283

* cited by examiner

*Primary Examiner*—Gary L Laxton
(74) *Attorney, Agent, or Firm*—Ostrolenk, Faber, Gerb & Soffen, LLP

(57) ABSTRACT

A switch mode power supply in which a control loop responsive to an input signal representative of the power supply output to provide a compensated error signal; and a PWM signal generator responsive to the compensated error signal to generate a variable duty cycle drive signal for the drive circuit having a selectable repetition rate. The control loop is implemented by digital circuitry, and the PWM signal generator is implemented by analog circuitry.

8 Claims, 4 Drawing Sheets

HYBRID DIGITAL-ANALOG SWITCHED POWER SUPPLY

RELATED APPLICATION

The present application is based on and claims the benefit of U.S. Provisional Application No. 60/549,316, filed on Mar. 1, 2004, entitled DIGITAL-ANALOG HYBRID PWM, the entire contents of which are expressly incorporated herein by reference.

FIELD OF THE INVENTION

The present invention relates to switch mode pulse width modulation (PWM) power supplies, and more particularly such power supplies having a hybrid digital analog implementation which avoids disadvantages associated with purely digital implementations.

The invention is described in the context of a conventional synchronous buck converter as well known to those skilled in the art, but it is to be understood that the invention is applicable to any switching power supply topology, and thus can be used in synchronous and non-synchronous power supplies, for AC-DC conversion, DC-DC conversion, etc., and in electronic power supplies, motor drives, lighting, and other suitable applications.

BACKGROUND OF THE INVENTION

Switched power supplies have numerous applications in electronic devices, lighting, and motor drives, and several basic types are well known to those skilled in the art. As the art of switched power supplies has developed, the various system components were first implemented as analog circuits.

FIG. 1 illustrates in simplified form, the general architecture of a single phase analog switched power supply 100. For consistency of description, the topology shown is that of the synchronous buck converter, but again, it is to be understood that the context is for illustrative purposes only.

The exemplary device 100 includes a high-side switch 105, a low-side switch 110 connected to the high-side switch at a switch node 115, an output inductor 120 connected to the switch node 115, and an output capacitor 125 connected to the output inductor 120. High and low-side switches 105 and 110 may be power MOSFETS, IGBTS, or other bipolar transistors or other suitable devices which can be switched between a highly conductive state and a substantially non-conductive state.

The DC power is provided to a DC bus 150 from an AC source through a suitable rectification circuit (not shown) of any conventional type well known to those skilled in the art.

In operation, gate drive signals for the high-side and low-side switches 105 and 110 are provided at 140 and 145 respectively by a control circuit 130 to produce a desired output voltage across a load 135, which might, for example, be an electronic device such as a computer or an electric motor. For this purpose, control circuit 130 includes logic circuits which control the on and off times (duty cycle) of the switches.

Duty cycle control is customarily provided by pulse width modulation derived from a repetitive triangular waveform which is compared to an error signal to generate PWM duty cycle pulses which are provided to a suitable gate drive circuit.

To meet the load current demand while providing adequately regulated voltage, a suitable feedback regulation loop 155 is provided by which signals representing relevant operating parameters such a load current or output voltage are transferred to control circuit 130. Control circuit 130 utilizes these signals to provide compensation, filtering, or other signal processing, and to control the switching times of switches 105 and 110.

The illustrated configuration and its manner of operation are well known to those skilled in the art, and further description will be omitted in the interest of brevity.

Where the current demand of the load exceeds what can conveniently be provided by the circuit of FIG. 1, or for powering large industrial motors, multiple circuits can be combined as illustrated at 200 in FIG. 2. Here, multiple output phases 205a, 205b, . . . , 205n feed load 135 through separate inductors 215a, etc. and output capacitor 125. When the load is a multi-phase motor, each phase 205a, 205b, . . . 205n one of the phase windings of the motor through a separate LC circuit.

Control of the power supply is provided by a suitable multi-phase control circuit 210, and a feedback circuit (not shown) of any suitable design, as will be understood by those skilled in the art.

Although switched power supplies implemented using analog technology are in widespread use, numerous advantages of digital implementation over analog for test and measurement, machine control, motor control, and communication are now recognized. Among these are intelligent fault resolution, accurate timing, unit-to-unit repeatability, lack of component drift over time and temperature, firmware design control, and accuracy of implementing complex functions. As these became well known, the application of digital techniques to power supply design to began to receive serious consideration.

FIG. 3 illustrates the architecture of a switched PWM power supply (again in the exemplary context of a synchronous buck converter) implemented using digital technology. Here, the switching is performed by high and low side switches 302 and 304 (shown as MOSFETS) connected between a positive DC bus 308 and ground 310 or, depending on the application, positive and negative DC busses. A common node 306 between the switches is connected through an inductor 312 to an output capacitor 314 to drive a load 316.

A gate drive unit 318 which includes a dead time control circuit 364 and gate drivers 366 and 368, as well as any other conventional or desired circuitry, receives PWM duty cycle control signals at terminal 320 from the PWM logic generally denoted at 322, and described more fully below.

In a digitally implemented switched power supply, the control loop may typically include one or more sensors (not shown), outputs of which are provided on a signaling path 354, and are digitized in an A/D converter 352 of any conventional or desired design. The output of A/D converter 352 is provided over a signal bus 356 to a digital conditioning unit 358. This may be implemented as a programmed microprocessor, a digital signal processor, an ASIC, or in any other suitable or desired manner to provide digital filtering, and compensation according any suitable or desired compensation algorithm customarily employed in analog or digital switching power supply control loops including, but not limited to non-linear control functions or lookup tables. This creates an error "signal" in the form of a numeric representation of the compensated feedback signal on a signal bus 360.

The numerical error information on signal bus 360 is applied directly to digital logic unit 322 which generates the PWM gate drive signals for switches 302 and 304. Logic unit 322 includes a down counter 362 and a master clock 324 connected to drive counter 362, and to set a latching circuit 326 through a divider circuit 328. A reset signal for latch 326 is provided by the underflow or "borrow" output of counter 362. The latch reset output, in turn, provides a cycle start signal to counter 362 to load the error signal on bus 360. The output of latch circuit 326 is used to generate the PWM duty cycle pulses which are provided to the gate drive circuit 318 described above.

As illustrated, 8 bit logic is employed. Master clock 324 runs at 256 Mhz whereby down counter 362 is clocked at 256 Mhz. Divider 328 provides a divide by 256 function whereby a 1 Mhz signal is provided to set PWM latch 326.

Adoption of digital control techniques for motor drive, lighting, and other low frequency switching applications has progressed well, but adoption of digital control for high frequency switching power supply design has been slow due to high cost, despite the potential benefits.

Also, an inherent limitation with digital implementation exists when power supplies are operated simultaneously at high switching frequencies to accommodate rapid load transients, and with high accuracy to provide good output voltage stability. This problem is caused by the fact that any increments in pulse width for a true digital PWM can be no shorter than the main clock frequency. Consider, for example, a PWM system driven by a 100 Mhz clock, for which the minimum pulse width change is 10 ns. For a 1 Mhz PWM frequency, the switching interval pulse width is on the order of 100 ns, so individual duty cycle step changes (10 ns) can only be 10% of the switching interval. In most instances, this simply can not yield the required accuracy. Even if the PWM frequency can be reduced to 100 Khz, the step change is only 1%, which is inadequate for many power supplies.

Thus a need clearly exists for digital power supply implementation which provides the benefits of digital technology without the above described limitation.

SUMMARY OF THE INVENTION

The present invention satisfies the forgoing need by providing a hybrid switched power supply in which the PWM drive for the high and low side switches is implemented with analog technology, while the control loop is implemented with digital technology. This permits maximum use of digital circuitry and minimizes the analog content while easily allowing PWM resolution of 0.1% or less, even at PWM interval frequencies of 1 MHz or more.

DETAILED DESCRIPTION OF EMBODIMENTS OF THE INVENTION

Figure 1:
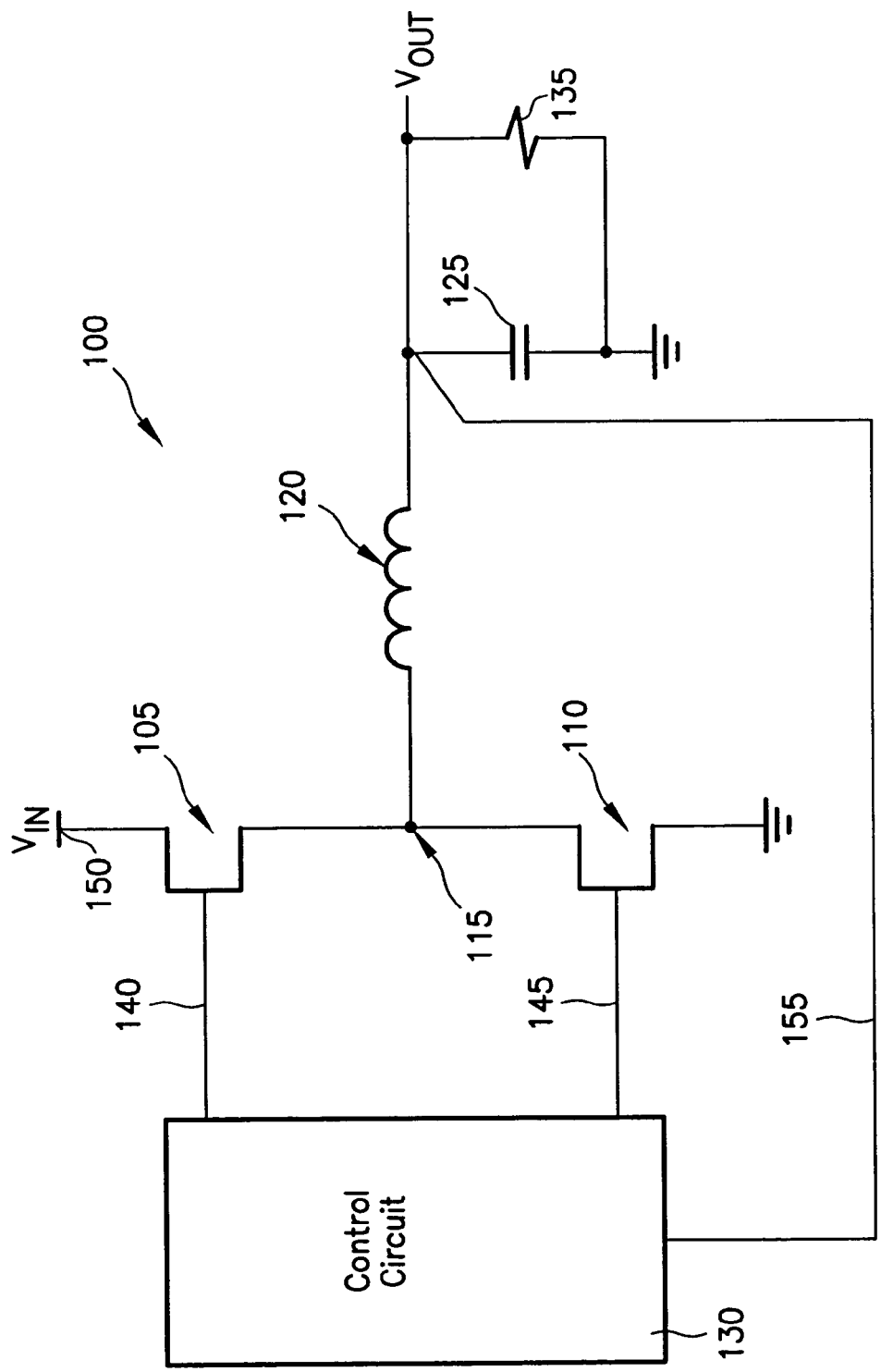
FIG. 1 is a block diagram illustrating the basic construction and operation of a conventional single phase analog switched power supply.
Figure 2:
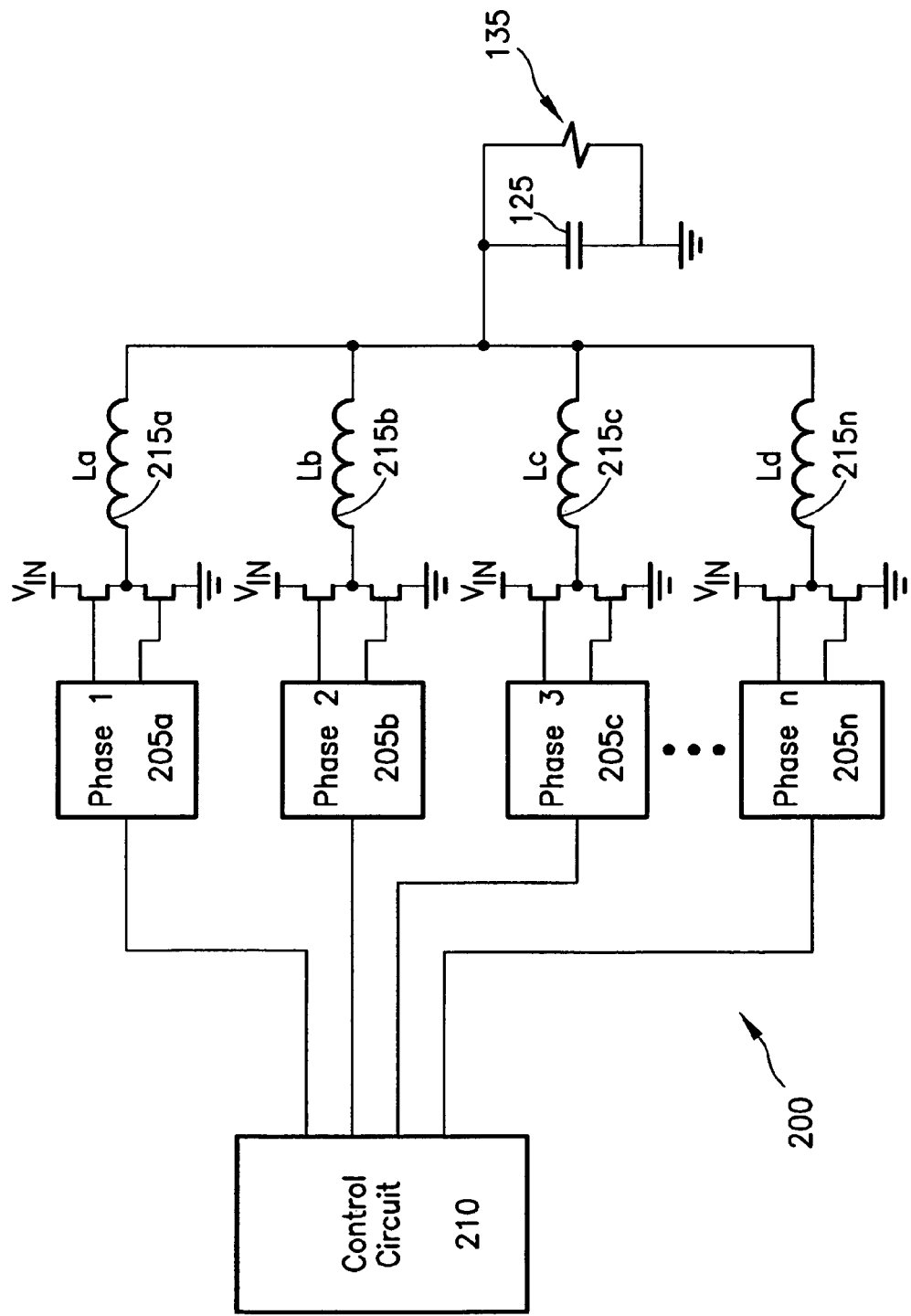
FIG. 2 is a block diagram illustrating the basic construction and operation of a conventional multi-phase analog switched power supply.
Figure 3:
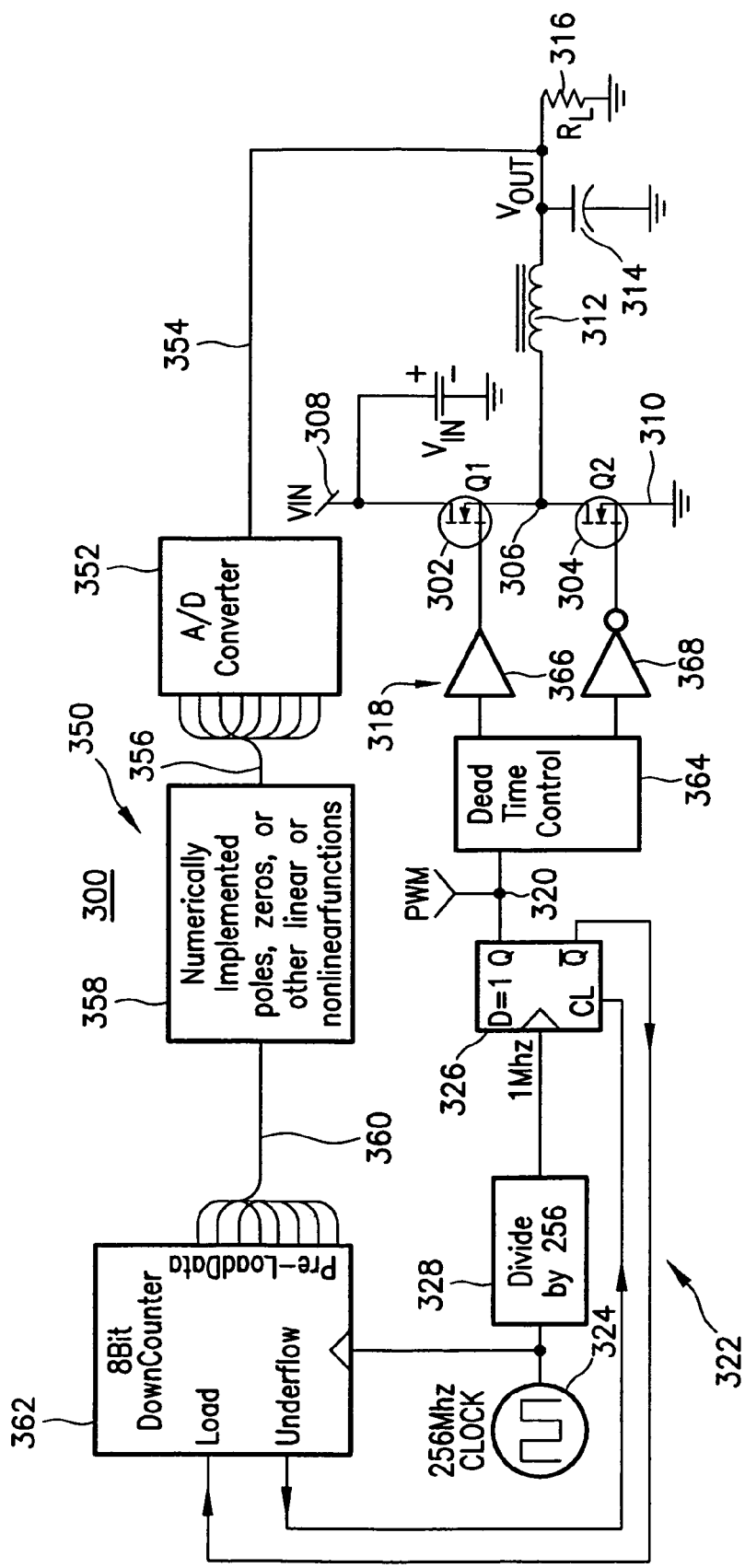
FIG. 3 is a block diagram illustrating the basic construction and operation of a single phase switched power supply implemented using digital technology.
Figure 4:
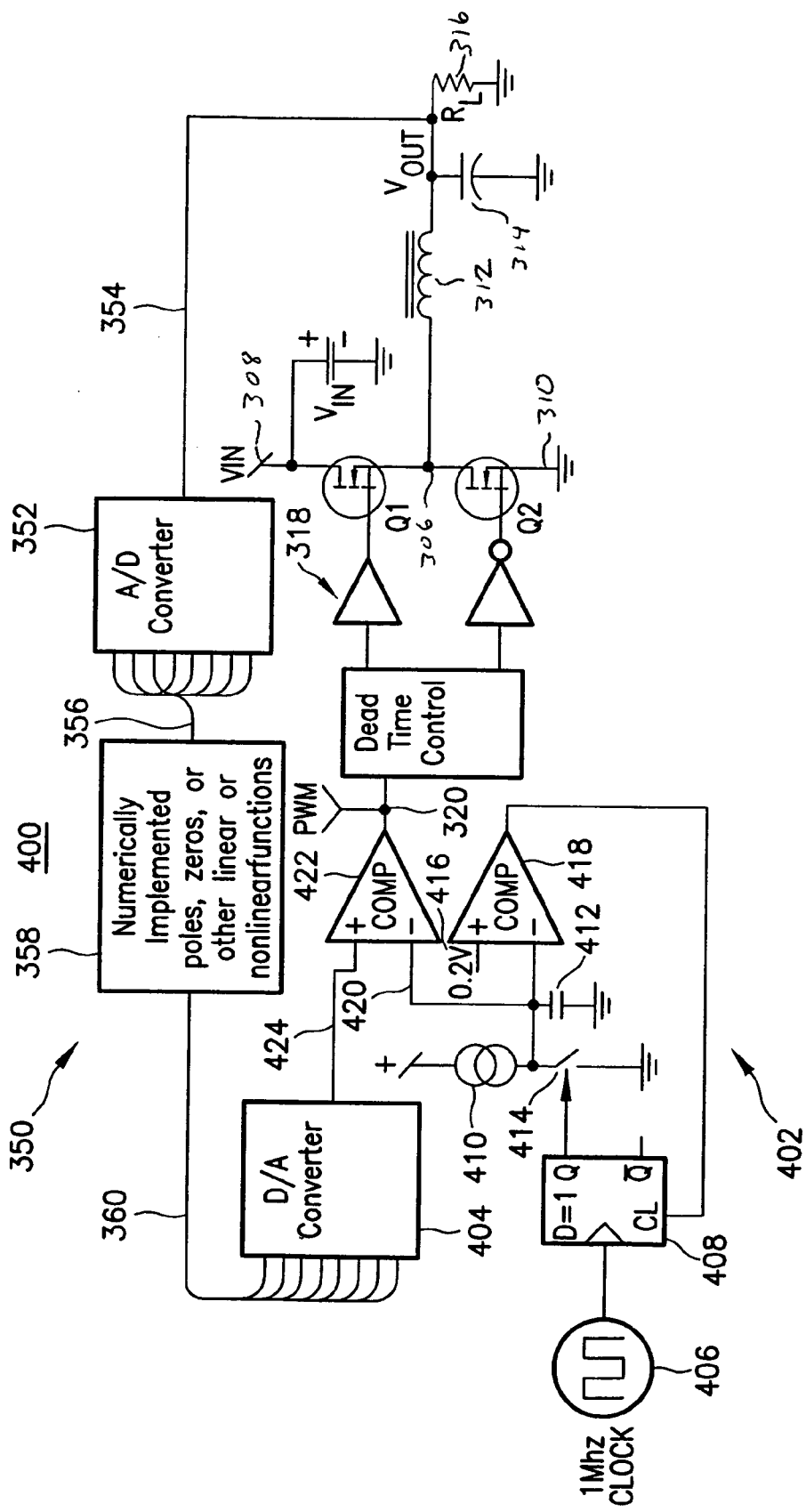
FIG. 4 is a block diagram illustrating an exemplary embodiment of a hybrid digital-analog PWM power supply according to the present invention.

FIG. 4 illustrates at 400, the architecture of the hybrid digital-analog PWM power supply according to the invention. For convenience, elements which are the same as those of the all-digital implementation of FIG. 3 are assigned the same reference numbers in FIG. 4 as in FIG. 3.

Thus, switching is performed by high and low side MOSFET switches Q1 and Q2 connected between positive DC bus 308 and ground 310, with a common node 306 between the switches connected through an inductor 312 to an output capacitor 314 to drive a load 316.

Gate drive unit 318 which is constructed as in FIG. 3, receives the PWM duty cycle control signals at terminal 320 from an analog PWM logic unit generally denoted at 402, and described more fully below.

As in FIG. 3, according to this invention, control loop 350 is implemented digitally. Thus, one or more sensor outputs are provided on a signaling path 354, and are digitized by an A/D converter 352 of any conventional or desired design to generate an output signal having 8 bit or any other desired resolution. The output of A/D converter 352 is provided over a signal bus 356 to a digital conditioning unit 358. Again, as in FIG. 3, this maybe implemented as a programmed microprocessor, a digital signal processor, an ASIC, or in any other suitable or desired manner to provide digital filtering, and compensation according any suitable or desired compensation algorithm customarily employed in analog or digital switching power supply control loops, again, including, if desired, non-linear control functions or lookup tables.

According to the invention, the compensated digital feedback error signal on a signal bus 360 is converted back to analog form by a digital to analog (D/A) converter 404 for use in analog pulse width modulator 402.

Although PWM unit 402 can be of any suitable or desired design, one preferred implementation as illustrated in FIG. 4 includes a master clock 406 connected to set a latching circuit 408. A current source shown schematically at 410 is connected to charge a timing capacitor 412. A grounding switch 414, e.g., a transistor configured to be closed when latch 408 is set, and opened when latch 408 is cleared, controls the discharge cycle for timing capacitor 412.

The voltage across capacitor 412 is compared to a reference voltage at an input 416 of a timing comparator 418, the output of which is coupled to reset latch 408. The purpose of comparator 418 is to clear latch 408 when timing capacitor 412 is discharged so that the PWM timing cycle can begin.

The voltage across capacitor 412 is also proved at a first input 420 of PWM comparator circuit 422. This compares the analog error signal provided by D/A converter 404 at terminal 424 to the rising voltage representing the accumulation of charge on capacitor 412 to generate the PWM duty cycle pulses. These, in turn, are provided to the gate drive circuit 318 described above.

A key advantage of the present invention is that PWM resolution is not tied to any clock speed. The example shown employs 8 bit resolution, but other greater or lesser resolutions are possible. That resolution is unrelated to the 1 Mhz switching frequency of the example, which may be either higher or lower without affecting PWM resolution.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A switch mode power supply comprising:
a semiconductor switching circuit connected to a source of DC;
output circuitry coupled to the semiconductor switching circuit adapted to drive a load;
a drive circuit operative to control the switching circuit;
a control loop, the control loop being comprised of:
an A/D converter which receives an analog input representative of the power supply output, and which provides a multiple bit output signal;
a digitally implemented processing unit responsive to the output signal from the A/D converter to generate a multiple bit digital error signal; and
a D/A converter which receives the multiple bit digital error signal as an input, and which provides an analog output signal representative of the digital error signal; and
a PWM signal generator responsive to the analog output signal from the D/A converter to generate a variable duty cycle drive signal for the drive circuit, wherein the PWM signal generator further comprises:
a first comparator operative to indicate a reference voltage that is independent of the actual operation of the power supply; and
a second comparator receiving the reference voltage and the analog output signal from the D/A converter and operative to provide an output indicating the duty cycle of the variable duty cycle drive signal.

2. A switch mode power supply according to claim 1, wherein the PWM signal generator includes a triangle wave generator and the second comparator circuit which receives an output from triangle wave generator as a first input, and the output of the D/A converter as a second input.

3. A switch mode power supply according to claim 1, wherein the digitally implemented processing unit is operative to provide compensation for the output signal from the A/D converter according to a selected compensation algorithm.

4. A switch mode power supply comprising:
a semiconductor switching circuit connected to a source of DC;
output circuitry coupled to the semiconductor switching circuit adapted to drive a load;
a drive circuit operative to control the switching circuit;
a control loop responsive to an input signal representative of the power supply output to provide a compensated error signal; and
a PWM signal generator responsive to the compensated error signal to generate a variable duty cycle drive signal for the drive circuit,
wherein the control loop is implemented by digital circuitry, and the PWM signal generator is implemented by analog circuitry, and wherein the PWM signal generator further comprises:
a first comparator operative to indicate a reference voltage that is independent of the actual operation of the power supply; and
a second comparator receiving the reference voltage and the analog output signal from the D/A converter and operative to provide an output indicating the duty cycle of the variable duty cycle drive signal.

5. A switch mode power supply according to claim 4, wherein the digitally implemented control loop is operative to provide compensation for the signal representative of the power supply output according to a selected compensation algorithm.

6. A switch mode power supply according to claim 4, wherein: the switching circuit is comprised of high and low side semiconductor switches connected to a source of DC.

7. A switch mode power supply according to claim 4, wherein the PWM signal generator includes a triangle wave generator and the second comparator circuit which receives an output from triangle wave generator as a first input, and the compensated error signal in analog form as a second input.

8. A switch mode power supply according to claim 7, wherein the compensated error signal in analog form is provided by a D/A converter connected to the output of the control loop.

* * * * *